Aug. 5, 1958     L. L. MARSH     2,845,714
VOLUMETRIC PAINT MIXER

Filed Feb. 15, 1956     2 Sheets-Sheet 1

INVENTOR.
LYLE L. MARSH
BY
ATTORNEY

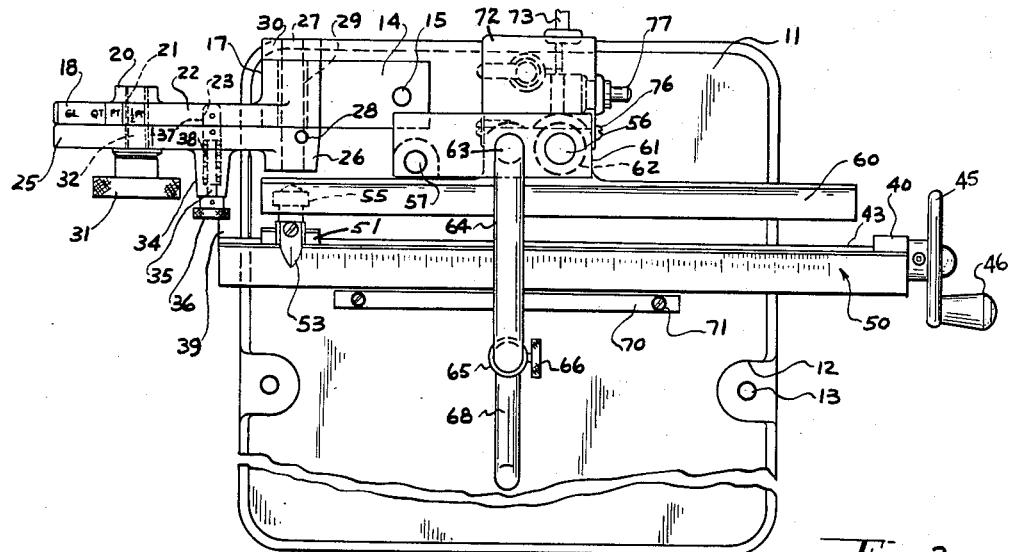

United States Patent Office 2,845,714
Patented Aug. 5, 1958

2,845,714

VOLUMETRIC PAINT MIXER

Lyle L. Marsh, St. Clair Shores, Mich., assignor to Marien-Metal Products Company, Hazel Park, Mich., a corporation of Michigan Application February 15, 1956, Serial No. 565,573

9 Claims. (Cl. 33—126.7)

This invention relates to a volumetric paint mixer, and more particularly to a device for proportioning standard color ingredients for producing a predetermined quantity and color of mixed paint.

Heretofore various devices have been provided for accomplishing this result. These devices have been characterized by mechanisms of a cumbersome nature and incorporating numerous parts.

It is the primary object of the present invention to produce a greatly simplified color proportioning device which will accurately provide for the addition and mixing of predetermined quantities of different color ingredients for achieving a predetermined color, in accordance with a formula for such color.

It is the further object of the present invention to provide in such device an upright ingredient level indicator adapted for vertical movement within a paint mixing container, together with movable means in conjunction with a scale responding to the total number of parts in the desired mixture and with an interconnection between said movable means and the support for the fluid level indicator whereby such movement of the movable means corresponding to a predetermined formula will effect corresponding proportional vertical movements of the paint indicator so that one will know when to stop pouring a particular color.

It is the further object of the present invention to provide a paint color proportion device, together with novel connecting means between the movable member with respect to a fixed scale and the ingredient level indicator for accomplishing the above described result.

It is the further object of the present invention to provide a novel mounting means for the ingredient level indicator together with an angularly adjustable arm and wherein the angle of adjustment corresponds to the vertical height of the container to be filled to a predetermined point.

It is the further object of the present invention to provide a novel proportioning device which will provide for the accurate proportioning of the color ingredients in a container and in accordance with a predetermined formula.

It is the still further object of the present invention to incorporate in the present proportioning device an angularly adjustable scale and wherein the vertical distance between the limits of said scale corresponds to the final height of the paint to be mixed.

These and other objects will be seen from the following specification and claims in conjunction with the appended drawings, in which:

Fig. 2 is a fragmentary plan view thereof.

Fig. 3 is a right side elevational view thereof.

Figure 1:
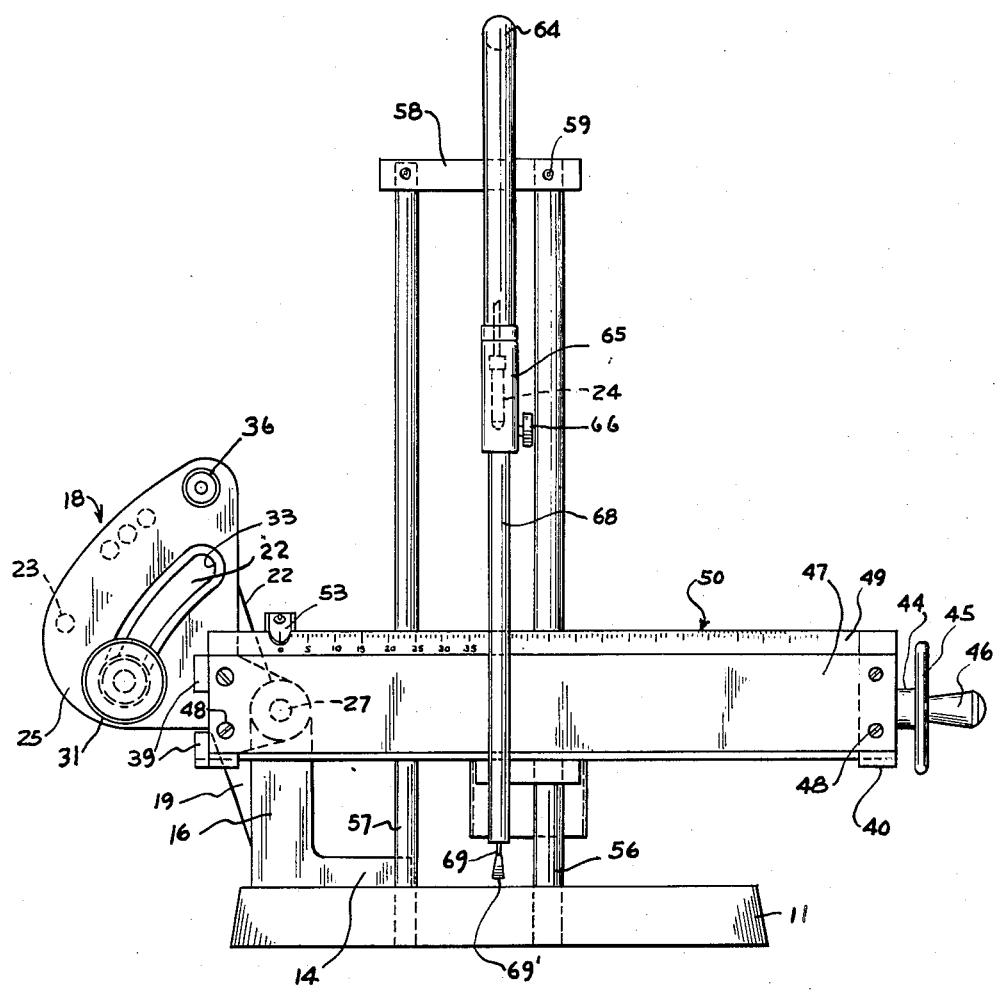
Fig. 1 is a front elevational view of the present paint ingredient proportioning device.

It will be understood that the above drawings illustrate merely a preferred embodiment of the invention, and that other embodiments are contemplated within the scope of the claims hereafter set forth.

The present proportioning device includes a horizontally disposed platform 11 having a pair of oppositely arranged notched portions 12 vertically apertured as at 13 to provide a convenient means of securing the platform in position as by a screw or bolt.

Bracket 14 mounted upon the rear of platform 11 and secured thereto as at 15 has an upright pedestal 16 which terminates in the rearwardly extending cylindrical boss 17. Laterally of said boss and forming a part thereof is the projecting flat scale plate 22 which has formed transversely therethrough a series of spaced apertures 23, as shown in Fig. 1, which correspond to the total quantity of paint mixture designations 18 which are scored in the said scale plate opposite said apertures. The indicia 18 indicates gallons, quarts, pints or half pints. Scale plate 22 has a reinforcing webbing 19 depending therefrom which blends with pedestal 16.

Boss 20 is formed upon and projected rearwardly of scale plate 22 and has an internal threaded aperture 21 which also extends through the said scale plate. Extension plate 25, of substantially the same shape as scale plate 22, is slidably juxtaposed over plate 22 and forms an integral part of the elongated arm shown in Fig. 1 which carries scale 50.

Extension plate 25 has a cylindrical boss 26 normally registerable with boss 17. Said bosses are transversely apertured to cooperatively receive pivot pin 27 which is suitably secured to extension plate 25 as by the pin 28 and is rotatively journaled within the corresponding bushing 29 nested in scale plate boss 17.

Accordingly, there is provided a pivotal mounting for the lever arm hereafter described which is adapted for angular adjustments with respect to the said platform to variable acute angles depending upon the total quantity of paint to be mixed in the particular container C which is mounted on platform 11 and shown in phantom lines in Fig. 3. Collar 30 registers with the end face of boss 17 and is suitably secured to pivot pin 27 for retaining the same in assembled relation upon bracket 16.

The hand knob 31 has an axial screw 32 which slidably projects through the arcuate slot 33 in extension plate 25 and threadedly engages the aperture 21 formed in scale plate 22 and the corresponding boss 20 whereby the said arm and extension plate may be effectively secured in any desired position of angular adjustment with respect to platform 11.

As shown in Fig. 2, outwardly projecting boss 34 on extension plate 25, provides a mounting for the detent pin 37 which forms a part of shaft 35 carrying the outer handle 36, there being a suitable coiled spring 38 interposed between the detent 37 and a portion of boss 34 normally urging said pin into locking position within one of the plurality of transverse apertures 23 formed through scale plate 22.

As above described, plate 22 has a scale 18 which is calibrated for gallons, quarts, pints and half pints, so that the said detent pin 37 under the action of the spring 38 will project within one of the preselected apertures 23 depending upon the quantity of paint to be mixed within container C for thereby securing the extension plate and the associated horizontally disposed arm in the desired position of angular adjustment for the particular quantity of paint to be measured. The detent pin 37 may be released by application to the handle 36 against the action of spring 38. Accordingly, the extension plate 25 may be adjusted to different or intermediate acute angles with respect to platform 11 if the quantity of paint to be measured happens to be of a vertical height different than that set forth on scale 18 and which corresponds to the several apertures 23. In any such intermediate position of adjustment, the extension plate 25 is secured with respect to scale plate 22 by means of the locking screw 32 and its handle 31 which is adapted to operatively and frictionally engage the extension plate 25.

The inner portion of extension plate 25 terminates in the forwardly projecting arms 39, Fig. 1, to which the above mentioned lever arm is attached in the manner hereafter described. Apertured plate 40 is spaced longitudinally of the said arms 39 and is interconnected respectively with arms 39 by a pair of parallel spaced horizontally disposed guide rods 41 and 42 whose respective ends are secured within corresponding apertures in the said arms 39 and the plate 40.

Said arm has mounted thereon on the rear portion thereof the elongated screw 43 which is journaled through plate 40, as well as upon the arms 39, and is retained against longitudinal movement by a suitable collar, as well as by the collar 44, which carries hand wheel 45 and the projecting handle 46. Elongated substantially upright front plate 47 bridges plate 40 and the arms 39 and is suitably secured thereto as by the screws 48, Fig. 1. The upper portion of plate 47 terminates in the rearwardly and upwardly extending angular scale plate 49 which has marked thereon a suitable proportional parts scale 50 which corresponds to the total number of parts which make up the total of a predetermined mixture of color ingredients for producing a certain color corresponding to a particular paint formula.

A pointer 53 is provided upon the said arm which is inclined corresponding to the inclination of scale plate 49 and adapted for longitudinal movement thereover. Said pointer is supported at its rear end upon an upright arm 52 which extends upwardly from the apertured body or threaded nut 51 through which the screw 43 threadedly extends. Accordingly, rotation of hand-wheel 45 in one direction or the other will effect a corresponding longitudinal movement of pointer 53 with respect to scale 50.

The said apertured body 51 includes the rearwardly extending boss 54, Fig. 3, upon which is mounted the roller 55 which controls the vertical adjustments of the upright ingredient level indicator hereafter described.

There is provided upon platform 11 a pair of upright guide rods 56 and 57 which are suitably secured in the upright position shown in Fig. 1 with a suitable reinforcing cross bar 58 bridging their upper ends and secured thereto as by the fasteners 59.

There is provided as the control for the ingredient level indicator 68 a horizontally disposed vertically adjustable elevator 60, which normally rests upon roller 55.

In operation, the arm 47 will have assumed a position of acute angular adjustment with respect to platform 11 such that as the said pointer 53 moves throughout the limits of scale 50 there will be a vertical rise of the said pointer and accordingly a corresponding vertical rise of the roller 55 attached thereto. This will effect a corresponding vertical adjustment of elevator 60 which is mounted upon the guide rods 56 and 57. Said elevator has formed thereon or secured thereto a rearwardly extending block or boss 61 which is vertically apertured to slidably receive the said guides 56 and 57 respectively. Said boss includes a suitable guide bushing 62 therein for minimizing frictional contact with the guide rod 56.

The present upright ingredient level indicator includes an upright shaft 63 which is secured at its lower end within the boss 61 and has a reverse turned U-shaped portion 64 at its upper end terminating in the downwardly extending part which carries the socket 65, Fig. 3. Said socket houses a suitable bulb 24 for providing illumination to the light conductive, preferably plastic formed rod 68, whose upper end as at 67 is projected within socket 65 and secured therein as by the set screw 66. The lower end of rod 68 is adapted for positioning down into the container C mounted upon platform 11.

Secured upon the bottom of light transmitting rod 68 there depends the formed substantially upright pointer 69 of substantially reduced transverse dimension and which has a transverse bottom gaging surface 69' relatively to which the level of paint as it is introduced into container C will rise.

Mounted upon platform 11 forwardly of the guide rods 56 and 57 is a rectangular stop bar 70 secured thereto as at 71 which provides a point of registry for container C as in Fig. 3.

Housing 72 is arranged rearwardly of and suitably secured to the elevator block 61 as by the fasteners 76, Fig. 2. Said housing is in the nature of a control housing for the necessary electrical connections to the small bulb 24 which is nested within the socket 65.

For this purpose the electrical conduit 73 is joined to housing 72 and to a suitable control device 74, which may be in the nature of a very small transformer, there being a suitable switch button 77 connected therewith for energizing the electrical circuit through the conduit 75, Fig. 3. This conduit extends upwardly through the vertically movable arm 63 and its component 64 and at its other end is joined to the illuminating bulb 24 within socket 65. This light source is transmitted through the Lucite or other light conducting rod 68 down into the interior of container C for providing sufficient illumination to pointer 69 and its gaging surface 69'.

*Operation*

With the control arm 47 and the measuring scale 50 in the horizontal position shown in Fig. 1, longitudinal movement of pointer 53 under the control of hand-wheel 45—56 would produce no vertical adjustment of the paint level indicator 68—69, because said arm is parallel to the top surface of the platform.

If, for example, the total quantity of paint to be produced is either a gallon, quart, pint or half pint, as indicated by scale 18 on scale plate 22, Fig. 2, it is merely necessary to release detent 37 and to pivotally tilt arm 47 and extension plate 25 about its pivotal axis 27 until said detent registers with the corresponding aperture 23 in plate 22. The action of the spring 38 retains the said detent pin in the proper aperture 23 corresponding to the size of container C as indicated in scale 18 and thus anchors the arm 47 in an acute angular position with respect to platform 11.

The total vertical rise between the terminals of scale 50 corresponds to the predetermined height of the final mixture of color paint within the particular container selected. For example, should a total quantity of paint different from the quantities indicated on scale 18 be desired, i. e., if the user wishes to fill a small container to a height of two inches of the correct color, then with the detent temporarily released and with the pointer 53 moved to the top terminal of scale 50, the said arm 47 is tilted about its pivot 27 until the pointer 69 is elevated to the desired predetermined height. Thereafter, the friction screw 32 and its handle 31 are tightened with respect to extension plate 25. This means also that when the pointer 53 is returned by operation of hand-wheel 45 to the lower terminal of scale 50, the said paint level indicator 69—69' will be in substantial registry with the bottom of the empty container C.

As viewed in the drawings, the roller 55 is arranged directly in front of and in registry with the pivot pin 27, with the result that with the pointer 53 registering with the lower terminus of the scale 50, pivotal adjustment of arm 47 will effect no vertical adjustment of the paint level indicator pointer 69'. After the particular vertical height of final paint mixture has been ascertained and the arm 47 secured in proper position, it will be known to the operator that in moving the pointer 53 manually between the terminals of the scale 50, the said paint level indicator pointer 69' will have moved from the position shown in Figs. 1 and 3 to exactly the height which has been predetermined.

Now in the mixture of a particular color in accordance with a formula, it is, of course, contemplated that the final quantity will have a total number of parts exactly equal to what is shown in scale 50. If the formula provides that the initial ingredient will be 15 parts of the whole, then the operator turns hand-wheel 45 until the pointer reaches the indicia 15 on scale 50. There will have resulted through the action of roller 55, a vertical movement of elevator 60 and a corresponding vertical movement of paint level indicator pointer 69.

As a next step the particular standard color designated is now introduced slowly into container C until the level reaches the adjusted height of pointer 69', as may be visually noted accurately.

Now if the second color to be mixed specifies an additional number of parts, such as ten parts, then the hand-wheel 45 is again adjusted, moving pointer 53 to the "25" mark on scale 50. This has produced a proportional additional vertical movement of pointer 69' on the paint level indicator. The second color is then poured into container C until the level reaches the gage surface 69' of pointer 69. This process is continued, adding the respective colors until pointer 53 has moved between both terminals of scale 50. This means also that when the mixture has been completed, the paint level indicator and its pointer 69 will have reached the correct and predetermined vertical height of the final color mixture. The operator then knows that when the ingredients are properly mixed, the end color produced will be in exact accordance with the formula employed.

Having described my invention, reference should now be had to the claims which follow:

I claim:

1. In a device for proportioning standard color ingredients for producing a predetermined quantity and color of mixed paint, a platform adapted to support a mixed paint container, an upright ingredient level indicator vertically movable in said container, upright guide means on said platform, a horizontally disposed vertically adjustable elevator slidable on said guide means and joined to said indicator in supporting relation for vertical movements in unison, an elongated arm pivotally mounted adjacent one end upon said platform and angularly adjustable and fixed to variable acute angles depending upon the total quantity of paint to be mixed in said container, a standard proportional parts scale on said arm, a pointer movably mounted on said arm over said scale for successively measuring throughout the length of the scale the additive quantities of ingredient color components for a particular color formula to produce the desired total quantity of mixed paint, said pointer slidably supporting said elevator for effecting corresponding proportional vertical movements of said indicator, and a non-reversible drive mounted on and lengthwise of said arm operatively and movably engaging said pointer.

2. The color proportioning device of claim 1, the angularity of said arm determining a vertical rise between terminals of said scale corresponding to the height of the final paint mixture in said container, being the total vertical movement of said indicator.

3. The color proportioning device of claim 1, said guide means including a pair of upright rods mounted on said platform and a vertically apertured boss on said elevator slidable over said rods.

4. The color proportioning device of claim 1, said arm including a pair of spaced end supports, a pair of parallel spaced rods interconnecting said supports providing a slide amount for said pointer, an apertured body supporting said pointer slidably mounted on said rods, and a roller on said body on which said elevator rests, said roller adapted for moving lengthwise of said elevator on longitudinal adjustment of said pointer and normally at an acute angle thereto thereby governing its vertical movements, the engagement of said drive with said pointer being through said body.

5. In a device proportioning standard color ingredients for producing a predetermined quantity and color of mixed paint, a platform adapted to support a mixed paint container, an upright ingredient level indicator vertically movable in said container, and means for moving the indicator vertically to determine the required level of each of the color ingredients to be supplied to the container, said means comprising a lever pivotally mounted intermediate its ends on said platform, means for securing said lever in angularly adjusted position to indicate the total desired quantity of paint to be supplied to the container, vertically movable means on said platform joined to said indicator, means movably mounted on said lever supportably engaging said vertically movable means, the movable means on said lever being movable to positions along the length of the lever in accordance with a formula for the mixed paint based on a different quantity than the desired total quantity, and a non-reversible drive mounted on and lengthwise of said lever operatively engaging said movable means.

6. In a device for proportioning standard color ingredients for producing a predetermined quantity and color of mixed paint, a platform adapted to support a mixed paint container, a vertically movable paint level indicator slidably supported on said platform, a lever pivotally mounted on said platform and adjustable to different acute angles relative to said platform, a total quantity scale on said platform, a portion of said lever movable relatively to said scale on angular adjustment of said lever, a screw revolubly mounted on said lever, a scale on said lever indicating the proportional parts of the mixture, a movable pointer on said lever operatively engaging said screw and having an operative connection with said indicator, whereby an incremental movement of said arm pointer over its scale corresponding to the number of parts of an ingredient effects a corresponding proportional vertical movement of said indicator.

7. In a machine for proportioning the standard color ingredients of a desired mixed paint, a vertically movable indicator, a pivotal lever for controlling vertical adjustment of said indicator, means for securing said lever in angularly adjusted position relative to said indicator, means progressively movable over the length of said lever for selected distances and joined to said indicator to thereby raise the indicator different but corresponding proportional distances, and a non-reversible drive mounted on and lengthwise of said lever operatively and movably engaging said progressively movable means.

8. In a device for proportioning standard color ingredients for producing a predetermined quantity and color of mixed paint, a platform adapted to support a mixed paint container, an upright ingredient level indicator vertically movable in said container, upright guide means on said platform, a horizontally disposed vertically adjustable elevator slidable on said guide means and joined to said indicator in supporting relation for vertical movements in unison, an elongated arm pivotally mounted adjacent one end upon said platform and angularly adjustable and fixed to variable acute angles depending upon the total quantity of paint to be mixed in said container, a proportional parts scale on said arm, a pointer movably mounted on said arm over said scale for successively measuring throughout the length of the scale the additive quantities of ingredient color components for a particular color formula to produce the desired total quantity of mixed paint, said pointer slidably supporting said elevator for effecting corresponding proportional vertical movements of said indicator, the pivotal mounting of said arm consisting of a bracket on said platform including a scale plate with a total quantity scale thereon, an extension plate on said arm overlying said scale plate and movable relatively thereto on pivotal adjustment of said arm and including a pointer movable relative to said scale, and locking means between said plates for securing said arm in angularly adjusted position.

9. In a device for proportioning standard color ingredients for producing a predetermined quantity and color of mixed paint, a platform adapted to support a mixed paint container, an upright ingredient level indicator vertically movable in said container, upright guide means on said platform, a horizontally disposed vertically adjustable elevator slidable on said guide means and joined to said indicator in supporting relation for vertical movements in unison, an elongated arm pivotally mounted adjacent one end upon said platform and angularly adjustable and fixed to variable acute angles depending upon the total quantity of paint to be mixed in said container, a proportional parts scale on said arm, and a pointer movably mounted on said arm over said scale for successively measuring throughout the length of the scale the additive quantities of ingredient color components for a particular color formula to produce the desired total quantity of mixed paint, said pointer slidably supporting said elevator for effecting corresponding proportional vertical movements of said indicator, the pivotal mounting of said arm consisting of a bracket on said platform including a scale plate with a total quantity scale thereon, an extension plate on said arm overlying said scale plate and movable relatively thereto on pivotal adjustment of said arm and including a pointer movable relative to said scale, there being a series of spaced transverse apertures formed in said scale plate angularly corresponding to predetermined paint container sizes, and a spring detent on said extension plate selectively registerable within said apertures for securing said arm in angularly adjusted positions.

References Cited in the file of this patent
UNITED STATES PATENTS

| | | |
|---|---|---|
| 1,864,341 | Davie | June 21, 1922 |
| 2,497,618 | Marienthal | Feb. 14, 1950 |
| 2,675,620 | Whitcomb | Apr. 20, 1954 |